United States Patent
Apvrille et al.

(10) Patent No.: US 7,139,891 B1
(45) Date of Patent: *Nov. 21, 2006

(54) METHOD AND SYSTEM FOR TIMESTAMPED VIRTUAL WORM IN A SAN

(75) Inventors: Axelle Apvrille, Toulouse (FR); Vincent Girier, Toulouse (FR); Jacques Debiez, Cugnaux (FR)

(73) Assignee: Storage Technology Corporation, Louisville, CO (US)

( * ) Notice: Subject to any disclaimer, the term of this patent is extended or adjusted under 35 U.S.C. 154(b) by 841 days.

This patent is subject to a terminal disclaimer.

(21) Appl. No.: 10/202,067

(22) Filed: Jul. 24, 2002

(51) Int. Cl.
*G06F 12/14* (2006.01)
*H04L 9/00* (2006.01)

(52) U.S. Cl. ................... 711/163; 713/178
(58) Field of Classification Search ......... 713/178, 713/168, 150
See application file for complete search history.

(56) References Cited

U.S. PATENT DOCUMENTS

| | | | | |
|---|---|---|---|---|
| 5,457,796 A | * | 10/1995 | Thompson | ........... 707/203 |
| 6,367,013 B1 | * | 4/2002 | Bisbee et al. | ........... 713/178 |
| 6,381,696 B1 | * | 4/2002 | Doyle | ........... 713/156 |
| 6,615,330 B1 | * | 9/2003 | Debiez et al. | ........... 711/163 |
| 2003/0126446 A1 | * | 7/2003 | Debiez et al. | ........... 713/178 |

* cited by examiner

*Primary Examiner*—Ayaz Sheikh
*Assistant Examiner*—Saoussen Besrour
(74) *Attorney, Agent, or Firm*—Brooks Kushman P.C.

(57) ABSTRACT

In a storage area network (SAN) including a storage device accessible by a remote client, a method is provided. The SAN is configured to allow input/output (I/O) data transport over the SAN between the remote client and the storage device. The method includes establishing a write once read many (WORM) server in the SAN between the storage device and the remote client. Data is received at the WORM server from the remote client. The method further includes appending a digitally signed timestamp to the data, specifying a plurality of locations, and sending the data and the timestamp to the storage device. The data is sent as a series of data over the SAN such that the series of data is written to the storage device at the specified plurality of locations. Future writing of data to the specified plurality of locations is prevented.

12 Claims, 2 Drawing Sheets

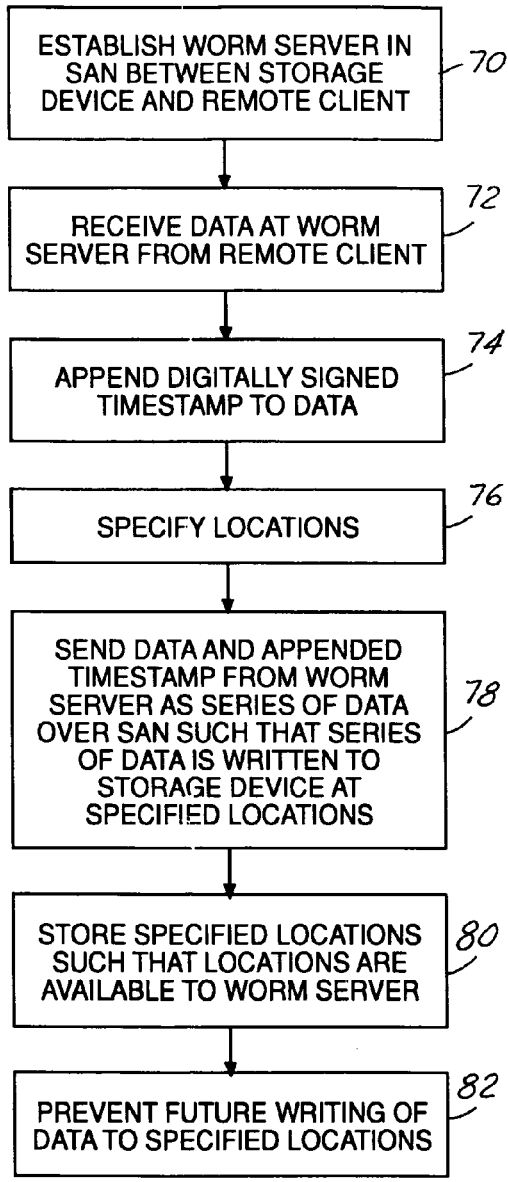
FIG. 4
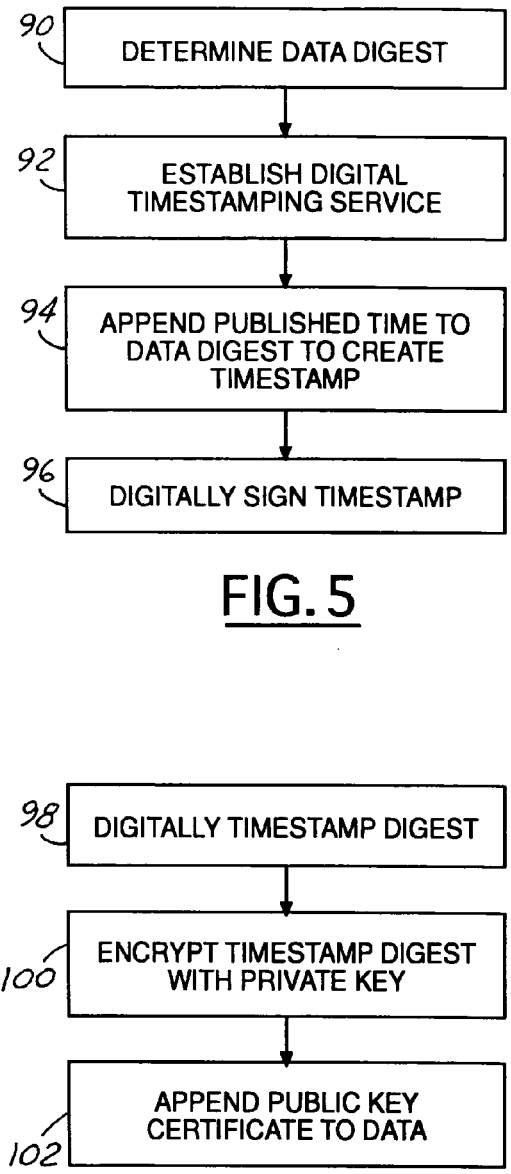
FIG. 5
FIG. 6

METHOD AND SYSTEM FOR TIMESTAMPED VIRTUAL WORM IN A SAN

BACKGROUND OF THE INVENTION

1. Field of the Invention

The present invention relates to a storage area network (SAN) that includes storage devices accessible by remote clients and that is configured to allow input/output (I/O) data transport over the SAN.

2. Background Art

A storage area network (SAN) typically connects to a local area network (LAN) or other network through a server or servers. The server or servers are connected to storage devices within the SAN to allow remote clients to store/retrieve data to/from the storage devices. The SAN is configured to allow input/output (I/O) data transport, and may utilize any suitable protocol.

One suitable protocol is internet small computer system interface (iSCSI). iSCSI is an emerging protocol which enables remote access to SCSI devices (tapes, drives, libraries . . . ). Instead of requiring a direct physical link to the device (limited in length and number of accessible peripherals), iSCSI enables sending SCSI commands (inquiry, request sense . . . ) over internet protocol (IP) networks. However, iSCSI alone is not security-aware, and anybody can sniff the IP network, read sent data, or even modify it. Consequently, it has been suggested to use iSCSI on top of a secure internet protocol security (IPSec) link. IPSec is a security protocol operating at the IP layer for negotiating encryption and authentication. IPSec may use encryption and digital signatures for everything between two hosts to provide confidentiality—making sure people cannot read information sent over the IP link, integrity—making sure any slight modification of data (from an intruder) can be detected, and authenticity—identifying parties that are communicating.

Although IPSec advantageously provides confidentiality, integrity, and authenticity, the advantages offered by IPSec require significant overhead. IPSec offers multiple security levels, so all parameters (security level, algorithms to use, key sizes . . . ) must be negotiated before each transfer. This is both complex and slows down transfer. IPSec is based on public key cryptography. Consequently, a PKI (public key infrastructure) has to be managed, which requires significant work. IPSec has a lot of security options and parameters to transfer, and consequently, secured packets grow in size which also adds to the inefficiencies of IPSec.

In highly sensitive situations, IPSec may be a very useful and appropriate solution. However, under a number of conditions, IPSec may be over-secured for the particular situation and consequently not be very efficient.

For example, iSCSI is typically intended to be implemented over local area networks. In many situations, communications over the local area network may not require confidentiality or authentication because the LAN is already secured. However, particularly when a storage area network (SAN) is connected to a local area network (LAN), there is a need to store data remotely and to be able to retrieve that data later and prove that the data has not been modified. That is, there is a need for integrity, but not necessarily a need for the confidentiality and authentication that are also provided by IPSec.

For the foregoing reasons, there is a need for providing an acceptable security level for use in storage area networks that provides data integrity yet maintains efficiency.

SUMMARY OF THE INVENTION

It is, therefore, an object of the present invention to provide an improved system and method for providing data integrity that is suitable for use in storage area network (SAN) applications.

In carrying out the above object, in a storage area network (SAN), a method is provided. The SAN includes a storage device accessible by a remote client. The SAN is configured to allow input/output (I/O) data transport over the SAN between the remote client and the storage device. The method comprises establishing a write once read many (WORM) server in the SAN between the storage device and the remote client. The method further comprises receiving data at the WORM server from the remote client, appending a digitally signed timestamp to the data, and specifying a plurality of locations. The method further comprises sending the data and the appended digitally signed timestamp from the WORM server to the storage device. The data and the appended digitally signed timestamp are sent as a series of data over the SAN such that the series of data is written to the storage device at the specified locations. Future writing of data to the specified locations is prevented.

The term SAN as used herein means any network allowing I/O data transport between remote clients and storage devices, using any suitable protocol. Further, the WORM server performs virtual WORMing in that the storage device need not be a physically write-once read-many device. That is, WORM functionality is implemented virtually, at the WORM server.

In a preferred method, appending the digitally signed timestamp further comprises determining a data digest based on the data. A digital timestamping service having a private key and a public key is established. The digital timestamping service is capable of generating a published time. The published time from the digital timestamping service is appended to the data digest to create a timestamp. The timestamp is digitally signed with the digital timestamping service private key to create a digital signature.

In a preferred method, digitally signing the timestamp further comprises determining a timestamp digest based on the timestamp, and encrypting the timestamp digest with the digital timestamping service private key.

A preferred method further comprises appending the digital timestamping service public key to the data. More preferably, the digital timestamping service has a public key certificate. And, the method further comprises appending the digital timestamping service public key certificate to the data.

The storage device may take many forms such as a redundant array of inexpensive disks (RAID) array composed of a plurality of disk drives.

Further in preferred methods, the specified plurality of locations are stored such that the locations are accessible to the WORM server. Storing the locations is one way to allow the WORM server to prevent future writing of data to the specified locations.

Further, in carrying out the present invention, a system for use in a storage area network (SAN) is provided. The SAN includes a storage device accessible by a remote client. The SAN is configured to allow input/output (I/O) data transport over the SAN between the remote client and the storage device. The system comprises a write once read many (WORM) server in the SAN between the storage device and the remote client. The WORM server is programmed to receive data from the remote client, append a digitally signed timestamp to the data, and specify a plurality of locations. The WORM server is further programmed to send the data and the appended digitally signed timestamp to the storage device as a series of data over the SAN such that the series of data is written to the storage device at the specified plurality of locations. The WORM server prevents future writing of data to the specified plurality of locations.

In a preferred system, appending the digitally signed timestamp further comprises determining a data digest based on the data, establishing a digital timestamping service having a private key and a public key that is capable of generating a published time, and appending the published time from the digital timestamping service to the data digest to create a timestamp. The timestamp is digitally signed with the digital timestamping service private key to create a digital signature.

In a preferred system, digitally signing the timestamp further comprises determining a timestamp digest based on the timestamp. The timestamp digest is encrypted with the digital timestamping service private key. Preferably, the WORM server is further programmed to append the digital timestamping service public key to the data. More preferably, the digital timestamping service has a public key certificate, and the WORM server is further programmed to append the digital timestamping service public key certificate to the data.

The advantages associated with embodiments of the present invention are numerous. For example, embodiments of the present invention provide timestamped WORM traffic in a storage area network (SAN). The WORM server provides integrity yet maintains efficiency, and is appropriate for many situations that are not so highly sensitive to require IPSec yet still require data integrity. The present invention provides an acceptable security level for these specific situations in an efficient way. Embodiments of the present invention are suitable for use with the iSCSI protocol in a storage area network (SAN), but may also be suitable for other SAN applications such as fibre channel or any other network application where I/O data transport occurs between remote clients and storage devices.

The above object and other objects, features, and advantages of the present invention are readily apparent from the following detailed description of the preferred embodiment when taken in connection with the accompanying drawings.

BRIEF DESCRIPTION OF THE DRAWINGS

FIG. 4 illustrates a preferred method of the present invention;

FIG. 5 illustrates a preferred digital timestamping method of the present invention; and FIG. 6 illustrates a preferred digital signing method of the present invention.

DETAILED DESCRIPTION OF THE PREFERRED EMBODIMENT

Figure 1:
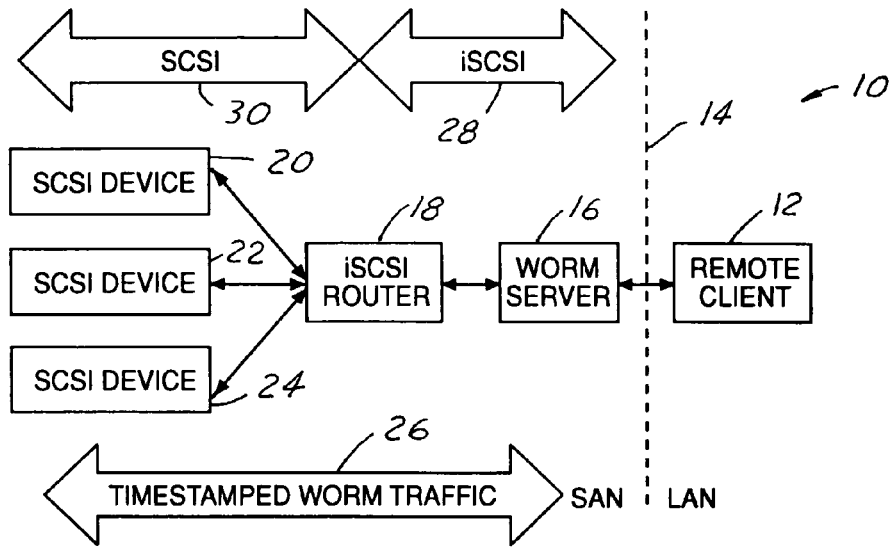
FIG. 1 illustrates network architecture in an iSCSI application of the present invention.

FIG. 1 illustrates network architecture at 10. A remote client 12 is located on a local area network (LAN). Dashed line 14 shows the division between the storage area network (SAN) and the local area network (LAN). In the application illustrated, timestamped virtual WORMed data is encapsulated into iSCSI traffic. WORM server 16 sits between remote client 12 and iSCSI router 18. Multiple SCSI devices 20, 22, 24 are in communication with iSCSI router 18. FIG. 1 illustrates a simplified network architecture, and it is appreciated that iSCSI applications may involve a number of remote clients and WORM servers, as well as a number of iSCSI routers with each having a number of SCSI devices connected thereto. Further, the iSCSI application is preferred, but embodiments of the present invention may have applications in any storage area network (SAN) configured to allow input/output (I/O) data transport, and may utilize any suitable protocol.

Figure 2:
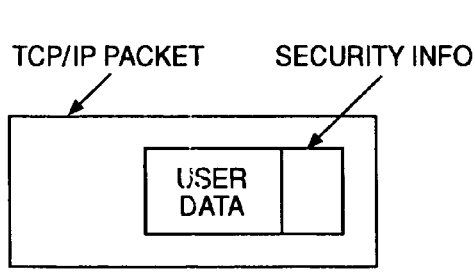
FIG. 2 illustrates the different levels of encapsulation of data in an IP packet.

With continuing reference to FIG. 1, WORM server 16 secures data and then forwards it to iSCSI router 18 in the form of transmission control protocol/internet protocol (TCP/IP) packets. FIG. 2 illustrates the different levels of encapsulation of data in a TCP/IP packet.

When remote client 12 desires to write data, the data is sent to WORM server 16. WORM server 16 is responsible for timestamping and WORMing the data. The iSCSI protocol takes the timestamped and WORMed data as input. As a result, it is the timestamped and WORMed data that transits over the network encapsulated in TCP messages as indicated by flow arrow 26. iSCSI router 18 receives the IP packet, retrieves the TCP message, sees the TCP message contains SCSI information and forwards the SCSI information to the appropriate SCSI device using its physical link to the device (flow arrows 28, 30). Finally, the appropriate SCSI device writes the timestamped and WORMed data on the appropriate media.

To read data, the process is similar, but WORM server 16 is now responsible for taking off the security information and verifying data integrity and time integrity. That is, WORM server 16 makes sure that data has not been modified. If an error is detected, an alarm can be sent to remote client 12.

Figure 3:
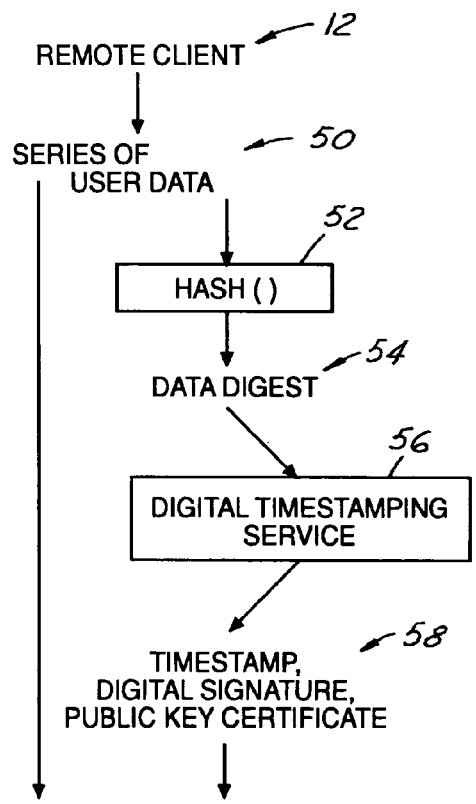
FIG. 3 illustrates digital timestamping.

FIG. 3 graphically illustrates a timestamping operation. Remote client 12 sends a series of user data 50 to WORM server 16. User data 50 is processed by hash function 52 to produce data digest 54. Digest 54 is sent to digital timestamping service 56 to obtain a timestamp. Digital timestamping service 56 returns a timestamp and digital signature 58. In addition, digital timestamping service 56 may return a public key certificate or a public key. Alternatively, the public key may be widely distributed so that it does not have to be returned by digital timestamping service 56.

The digital timestamping service may rely on an external trusted organism, or may rely on a trusted internal time source. Further, digital timestamping service 56 may be contained within WORM server 16 or may be separate. When reading the data back from storage, the timestamp and digital signature may be used to determine data integrity and timestamp authenticity.

FIG. 4 illustrates a preferred method of the present invention. At block 70 a write once read many (WORM) server is established in the SAN between the storage device and the remote client. The WORM protection or overwriting prevention, as implemented in embodiments of the present invention, functions as a virtual WORM in that the WORM protection does not rely on the hardware and media. At block 72, data is received at the WORM server from the remote client. The SAN is configured to allow input/output (I/O) data transport. At block 74, a digitally signed timestamp is appended to the data. At block 76, storage locations are specified. At block 78, the data and the appended digitally signed timestamp are sent from the WORM server to the storage device as a series of data over the SAN such that the series of data is written to the storage device at the specified plurality of storage locations. The specified locations are stored or remembered, at block 80, such that the locations are available to the WORM server. Storing the specified locations allows the WORM server to prevent future writing of data to previously specified locations (block 82). More specifically, the WORM server implements an overwriting prevention feature or virtual WORM protection.

More specifically, whenever data is processed in the WORM server, its storage location is memorized so that it is never possible to overwrite that location, that is, to provide virtual WORM protection. For a sequential access block device, a last specified block number may be stored or memorized to prevent future writing of data to already used blocks. For a random access block device, all specified block numbers are stored to prevent writing of data to previously used block numbers. That is, the WORM server keeps track of storage locations as locations are specified for writing data to them. The WORM server makes sure that once any particular location has been written to, that the future writing of data to that particular location is prevented.

FIG. 5 illustrates a preferred method of digital timestamping. At block 90, a data digest is determined based on the data. In a preferred embodiment, the data digest is determined using a hash function. A hash function is a transformation that transforms an input to a fixed size string. A cryptographic hash function is a one-way function that digests input data and has very few collisions. The capabilities of the cryptographic hash function are commonly used to provide data integrity. At block 92, a digital timestamping service is established. The digital timestamping service has a private key and public key, and is capable of generating a published time. At block 94, a published time from the digital timestamping service is appended to the data digest to create a timestamp. At block 96, the timestamp is digitally signed with the digital timestamping service private key to create a digital signature. Because the private key is kept secret, the digital signature cannot be forged. Suitable techniques for public/private key encryption are apparent to those of ordinary skill in the art.

FIG. 6 illustrates a preferred method for digitally signing the timestamp. At block 98, a timestamp digest is determined based on the timestamp. At block 100, the timestamp digest is encrypted with the digital timestamping service private key. As mentioned previously, it is preferred that the public key or public key certificate is also appended to the data (at block 102).

That is, in a preferred embodiment, digital signing a collection of data means taking the digest of the data and encrypting the digest with the private key. The encrypted digest is the digital signature of the data. Accordingly, when data is stored together with the digital signature of the data, the digital signature allows both authenticity and integrity to be checked. Using the public key to decrypt the encrypted digest authenticates that the digest was encrypted with the private key of the key pair and thus was signed by the owner of the private key.

Embodiments of the present invention advantageously utilize digital timestamping and virtual WORMing to provide security and integrity in a storage area network (SAN) environment. In the exemplary implementation of WORM over iSCSI, there are many benefits. For example, WORM functionalities are extended over a SAN, and all storage equipment in the SAN can receive data integrity guarantees and time integrity guarantees. Key management is reduced in that a single key pair is needed for the timestamp's signature. This key pair may be certified by a third party authority, which is responsible for all public key infrastructure. Additional security data appended by the WORM server is very small. For large volumes, in a preferred embodiment, it is estimated that only 0.008 percent data volume is added. Further advantages of WORM over iSCSI include the fact that there is no need for a preliminary negotiation concerning security level, algorithms, keys, as with existing IPSec techniques.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method using a storage area network (SAN) including a storage device accessible by a remote client, wherein the SAN is configured to allow input/output (I/O) data transport over the SAN between the remote client and the storage device, the method comprising:
   establishing a write once read many (WORM) server in the SAN between the storage device and the remote client;
   receiving data at the WORM server from the remote client;
   appending a digitally signed timestamp to the data;
   specifying a plurality of locations;
   sending the data and the appended digitally signed timestamp from the WORM server to the storage device as a series of data over the SAN such that the series of data is written to the storage device at the specified plurality of locations and accessible to the WORM server;
   preventing future writing of data to the specified plurality of locations using the WORM server.

2. The method of claim 1 wherein appending the digitally signed timestamp further comprises:
   determining a data digest based on the data;
   establishing a digital timestamping service having a private key and a public key, and capable of generating a published time;
   appending the published time from the digital timestamping service to the to the data digest to create a timestamp; and
   digitally signing the timestamp with the digital timestamping service private key to create a digital signature.

3. The method of claim 2 wherein digitally signing the timestamp further comprises:
   determining a timestamp digest based on the timestamp; and
   encrypting the timestamp digest with the digital timestamping service private key.

4. The method of claim 3 further comprising:
   appending the digital timestamp service public key to the data.

5. The method of claim 4 wherein the digital timestamping service has a public key certificate, the method further comprising:
   appending the digital timestamping service public key certificate to the data.

6. The method of claim 1 wherein the storage device comprises:
   a redundant array of inexpensive disks (RAID) array composed of a plurality of disk drives.

7. The method of claim 1 further comprising:
   storing the specified plurality of locations such that the locations are accessible to the WORM server.

8. For use in a storage area network (SAN) including a storage device accessible by a remote client, wherein the SAN is configured to allow input/output (I/O) data transport over the SAN between the remote client and the storage device, a system comprising:
- a write once read mane WORM server in the SAN between the storage device and the remote client, the WORM server being programmed to the receive data from the remote client, append a digitally signed timestamp to the data, specify a plurality of locations, send the data and the appended digitally signed timestamp to the storage device as a series of data over the SAN such that the series of data is written to the storage device at the specified plurality of locations accessible to the WORM server, and prevent future writing of the data to the specified plurality of locations using the WORM server.

9. The system of claim 8 wherein appending the digitally signed timestamp further comprises:
- determining a data digest based on the data;
- establishing a digital timestamp service having a private key and a public key, and capable of generating a published time;
- appending the published time from the digital timestamping service to the data digest to create a timestamp; and
- digitally signing the timestamp with the digital timestamping service private key to create a digital signature.

10. The system of claim 9 wherein digitally signing the timestamp further comprises:
- determining a timestamp digest based on the timestamp; and
- encrypting the timestamp digest with the digital timestamping service private key.

11. The system of claim 10 wherein the WORM server is further programmed to:
- append the digital timestamping service public key to the data.

12. The system of claim 11 wherein the digital timestamping service has a public key certificate, the WORM server being further programmed to:
- append the digital timestamping service public key certificate to the data.

* * * * *

UNITED STATES PATENT AND TRADEMARK OFFICE
CERTIFICATE OF CORRECTION

| | | |
|---|---|---|
| PATENT NO. | : 7,139,891 B1 | |
| APPLICATION NO. | : 10/202067 | |
| DATED | : November 21, 2006 | |
| INVENTOR(S) | : Axelle Apvrille et al. | |

It is certified that error appears in the above-identified patent and that said Letters Patent is hereby corrected as shown below:

Column 7, Line 6, Claim 8:

Delete "mane" and insert therefor -- many --.

Signed and Sealed this

Twenty-second Day of May, 2007

JON W. DUDAS
*Director of the United States Patent and Trademark Office*